Patented Mar. 13, 1923.

1,448,432

UNITED STATES PATENT OFFICE.

RENÉ CLAVEL, OF BASEL, SWITZERLAND.

PROCESS OF DYEING CELLULOSE ACETATE OR PRODUCTS MADE THEREWITH.

No Drawing.   Application filed December 8, 1921.  Serial No. 521,008.

*To all whom it may concern:*

Be it known that I, RENÉ CLAVEL, a citizen of the Swiss Republic, of Basel, Switzerland, have invented certain new and useful Improvements in the Process of Dyeing Cellulose Acetate or Products Made Therewith, of which the following is a specification.

Hitherto it has been assumed that artificial silk, films and other products made with cellulose acetate are not capable of being dyed directly or by ordinary dyeing processes, owing to the water-resisting properties of the cellulose acetate.

It has therefore been proposed to subject the cellulose-acetate products, for example artificial silk or films, to treatment with various organic or inorganic compounds before dyeing, with a view to swelling the cellulose acetate and increasing its receptivity for the dye in the subsequent dyeing process. It has also been proposed to subject the cellulose acetate silk, films or other products to treatment with alkalies, or partial saponification, with a view to facilitating the dyeing thereof.

It has now been found as the result of extensive research and experiment that the dyeing of cellulose acetate is not, as has hitherto been generally supposed, merely a physical phenomenon of adsorption. The remarkable discovery has been made that certain groups of dyestuffs in general—viz, hydroxyl groups, amino groups, imino groups, imide groups, nitro groups, nitroso groups (—N=O), isonitroso groups (=N.OH), acidylamino groups (H—N—CO.R, in which R stands for alkyl or aryl), and the azo groups (—N=N—), hereinafter referred to as active groups are active in the sense that they enable the dyestuff to enter into chemical reaction or combination with the cellulose acetate, and that such dyestuffs, whether of the direct, acid, basic, vat or other class, and whether soluble or insoluble in water, will dye cellulose acetate silk or other cellulose acetate products direct, in aqueous solution or suspension, without pretreatments such as referred to, if such active group or groups as before mentioned are present to a preponderating extent in the dyestuff, that is to say if the dyestuff contains one or more of such active groups and no sulpho group, or if the active groups are present in a numerically preponderant degree relatively to a sulpho group present in the dyestuff, i, e., if there are two or more of such active groups in such dyestuff containing one sulpho group. It has been found that the presence of more than one sulpho group in the dyestuffs weakens or arrests the power of combination of the active groups with the cellulose acetate and therefore the dyeing power of the dyestuff. Carboxyl groups in the dyestuffs appear to be indifferent relatively to the effect of the active groups.

According to the invention I may apply for the dyeing of cellulose acetate or cellulose acetate products, dyestuffs, whether soluble or insoluble, having the above indicated active character, belonging to any of the classes—direct dyes, acid dyes, basic dyes, dyes of the indigo group, vat dyes, natural organic dyes, or any other dyes having the character before referred to.

The dyeing may be effected in any appropriate or convenient way.

The dyeing power derived from the presence of one or more active groups in the absence of sulpho-groups, or the preponderating presence of the active groups relatively to one sulpho group in various classes of dyestuffs, is illustrated for example by the following, it being understood that these are given only by way of illustration and are in no way limitative:

*Monoazo-dyestuffs.*

Dyestuff from aniline and betanaphthol. (Fat-soluble orange.) Dyes cellulose acetate very well.
Dyestuff from paranitraniline and salicylic acid. (Alizarin yellow R.) Dyes well.
Dyestuff from betanaphthylamine monosulphonic acid and betanaphthol. (Silk ponceau G.) (K.) Dyes well, the active groups (azo and hydroxyl) being preponderant over the sulpho group.
Dyestuff from aniline and betanaphthol monosulphonic acid S. (Brilliant orange G.) (M.) Dyes well, the active groups (azo and hydroxyl) being preponderant over the sulpho group.

*Disazo dyestuff.*

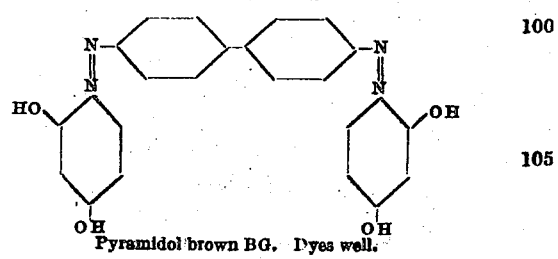
Pyramidol brown BG. Dyes well.

1,448,432

Triphenyl methane dyestuffs.

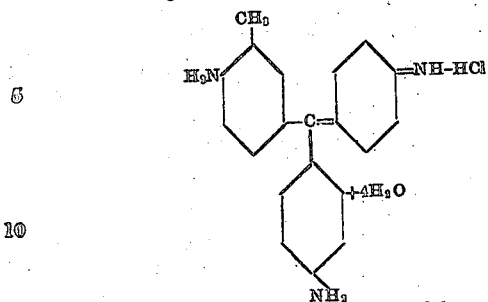

Fuchsin (DE). Dyes very well. (No sulpho groups.)

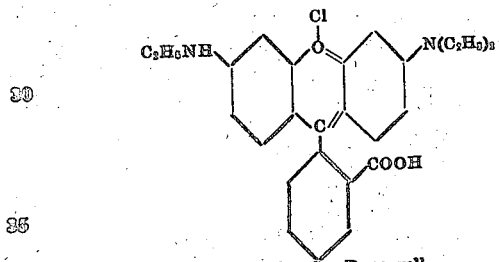

Chrome violet (G). Dyes well, although containing carboxyl groups.

Phthalein dyestuffs.

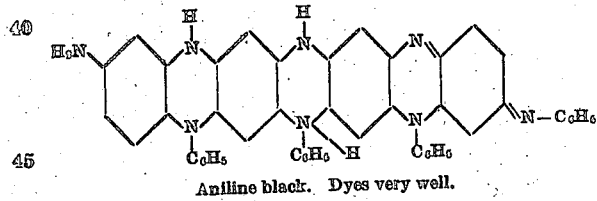

Rhodamine G. Dyes well.

Azine.

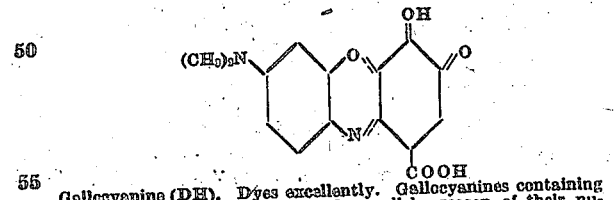

Aniline black. Dyes very well.

Oxazine and thiazine dyestuffs.

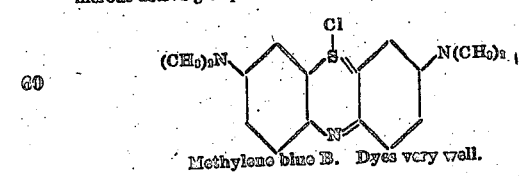

Gallocyanine (DH). Dyes excellently. Gallocyanines containing no sulpho groups or only one, dye well by reason of their numerous active groups and low sulphonation.

Methylene blue B. Dyes very well.

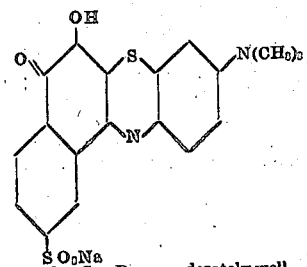

Brilliant-alizarine blue G. Dyes moderately well. Has one sulpho group.

Indulins.

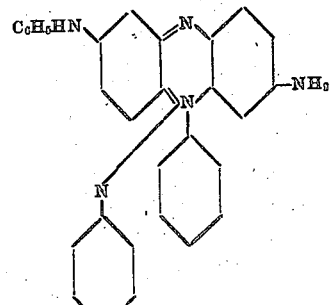

Indulin (water-insoluable). Dyes very well in suspension. The water-soluble sulphonated form of this body will only dye cellulose acetate very badly.

Oxyketones.

Alizarin. Two hydroxyl groups. Dyes well.

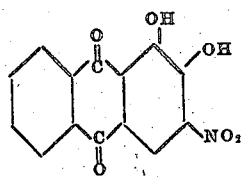

Alizarin orange. Two hydroxyls and one nitro group. Dyes better.

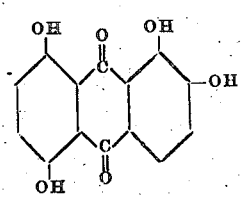

Alizarin Bordeaux paste. Dyes very well, owing to absence of sulpho groups.

Vat dyestuffs of the anthracene series.

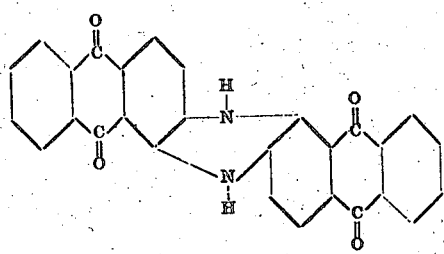

Indanthrene X.

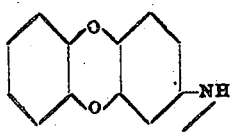
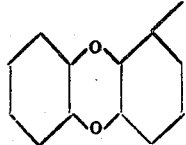
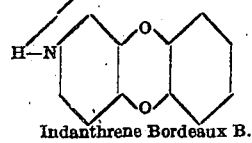
Indanthrene Bordeaux B.

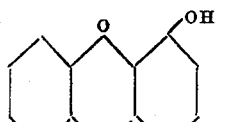
Algol rosa R.

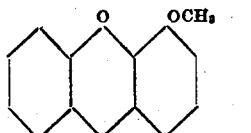
Algol scarlet G.

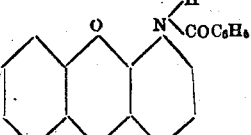
Algol yellow WG.

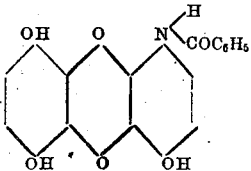
Algol violet B.

The insoluble dyestuffs of these classes which contain one or more of the active groups referred to, dye cellulose acetate well in aqueous suspension.

*Vat dyestuffs of the indigo groups.*

They dye acetate silk without vatting, i. e. in aqueous suspension.

*Natural organic dyestuffs.*

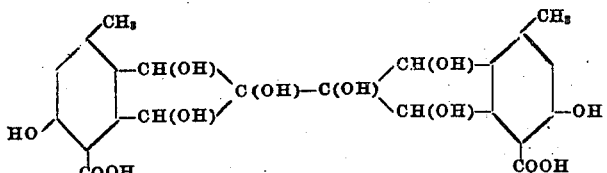
Cochinille.

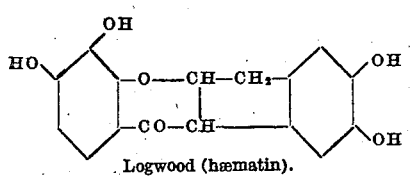
Logwood (hæmatin).

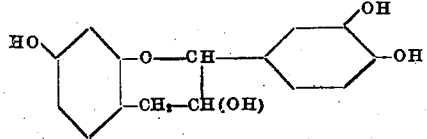
Catechu.

Dye well to the deepest shades, (e. g. as tin lake) for example.

In general as before mentioned it may be stated that the presence or effect of the active groups: hydroxyl groups, amino groups, imino groups, imide groups, nitro groups, nitroso groups, isonitroso groups, acidylamino groups, azo groups, in the dyestuffs enable the latter to react chemically with cellulose acetate and dye the same direct, provided that no sulpho group is present in the dyestuff or that only one sulpho group is present numerically preponderated by active groups. It may further be stated that this affinity and dyeing power increase with the number of active groups and decrease with the sulpho group.

In regard to basic dyes it is interesting to observe that whereas these are generally converted into sulphonated compounds for use in dyeing other textiles, such introduction of sulpho groups tends to render the dyeing of cellulose acetate difficult or impracticable. I have found that in proportion as the number of sulpho groups in a dyestuff is increased the dyeing power of the dyestuff is reduced, so that for example whilst it will dye with one sulpho group present if this is numerically preponderated by active groups, it may dye badly or not at all with several sulpho groups present. According to the invention, as regards dyeing with basic dyes containing no sulpho group, or containing only one sulpho group numerically preponderated by active groups, these are preferably employed in conjunction with salts such for example as magnesium chloride, stannous chloride, zinc chloride or the like which are capable of form double salts with the dyestuff or in the form of such double salts. Such employment presents an important advantage in that it gives even dyeing fast to light and washing, which is the more remarkable as generally it has been assumed that basic dyes are fugitive on textiles, and the result was not to be expected.

It is believed that the effect of such double salt forming salts is to form complexes with the dyestuff and the cellulose acetate. By way of example with malachite green, which can form a zinc or magnesium double chloride

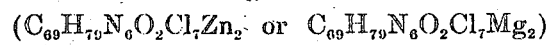
$(C_{69}H_{70}N_6O_2Cl_7Zn_2$ or $C_{69}H_{70}N_6O_2Cl_7Mg_2)$ it is believed that complexes are formed with the cellulose acetate molecule which may be represented for example by the formula $C_{69}H_{70}N_6O_2Cl_7Zn$=cellulose acetate molecule.

Salts capable of forming double salts with basic dyes may also according to the invention be employed with classes of dyestuffs other than basic dyes, for dyeing cellulose acetate.

The manner in which the invention can be carried out may be illustrated by the following examples, it being understood that these are given only by way of illustration and that they may be varied within wide limits.

*Example 1.*

5 kg of cellulose acetate silk are introduced into an aqueous dye bath of a Gallocyanine dye, e. g. Gallocyanine DH and kept in motion for about ten minutes whilst bringing the temperature up to 50° or 60°. The silk is left for about half an hour at this temperature and is then transferred into a bath at ordinary room temperature, containing acetic acid and oil emulsion, consisting of olive oil and olive oil-soap.

*Example 2.*

5 kilos of cellulose acetate silk are introduced into an aqueous foam bath produced according to British Patent 102310, containing insoluble induline in suspension. The temperature is raised to about 60° C. while keeping silk in the foam bath, the mechanical action of which brings the suspended dyestuff into intimate contact with the silk. The suspended dyestuff is taken up by the silk, which is then transferred to a bath at 35°, containing formic acid and oil emulsion consisting of olive oil and olive oil soap.

What I claim and desire to secure by Letters Patent is:—

1. A process for dyeing acetyl cellulose in artificial silk, film or other form, comprising the application for the direct dyeing of the acetyl cellulose in an aqueous medium, of a dyestuff having in its chemical constitution an active group content preponderant numerically over any sulpho group content of the dyestuff, the dyestuff in no case containing more than one sulpho group.

2. A process for dyeing acetyl cellulose in artificial silk, film or other form, comprising the application for the direct dyeing of the acetyl cellulose in an aqueous medium, of a dyestuff containing in its chemical constitution a plurality of active groups and not containing more than one sulpho group.

3. A process for dyeing acetyl celluloses in artificial silk, film or other form, comprising the application for the direct dyeing of the acetyl cellulose in an aqueous medium, of a dyestuff containing in its chemical constitution an active group and no sulpho groups.

4. A process for dyeing acetyl celluloses in artificial silk, film or other form, comprising the application for the direct dyeing of the acetyl cellulose in an aqueous medium, of a dyestuff containing in its chemical constitution a plurality of active groups and no sulpho groups.

5. A process for dyeing acetyl celluloses in artificial silk, film or other form, comprising the application for the direct dyeing of the acetyl cellulose in an aqueous medium, of a dyestuff of the active character referred to, in conjunction with a salt capable of forming a double salt or complex with the dyestuff and the cellulose acetate.

6. A process for dyeing acetyl celluloses in thread, film, or other form, comprising the application for the direct dyeing of the acetyl cellulose in an aqueous medium, of a basic dyestuff of the active character referred to, in conjunction with a salt capable of forming a double salt or complex with the basic dyestuff and the cellulose acetate.

7. A process for dyeing acetyl celluloses in thread, film or other form, comprising the application for the direct dyeing of the acetyl cellulose in an aqueous medium, of a non-sulphonated basic dyestuff of the active character referred to, in conjunction with a salt capable of forming a double salt or complex with the non-sulphonated basic dyestuff and the cellulose acetate.

8. A process of dyeing structures containing cellulose acetate, which comprises subjecting such structures to the action of an aqueous vehicle containing a dyestuff, which includes in its structure an active group content preponderant numerically over any sulpho group content of the dyestuff and which in no case contains more than one sulpho group, such vehicle being heated.

In testimony whereof I have hereunto subscribed my name.

Dr. RENÉ CLAVEL.